Figure 1:
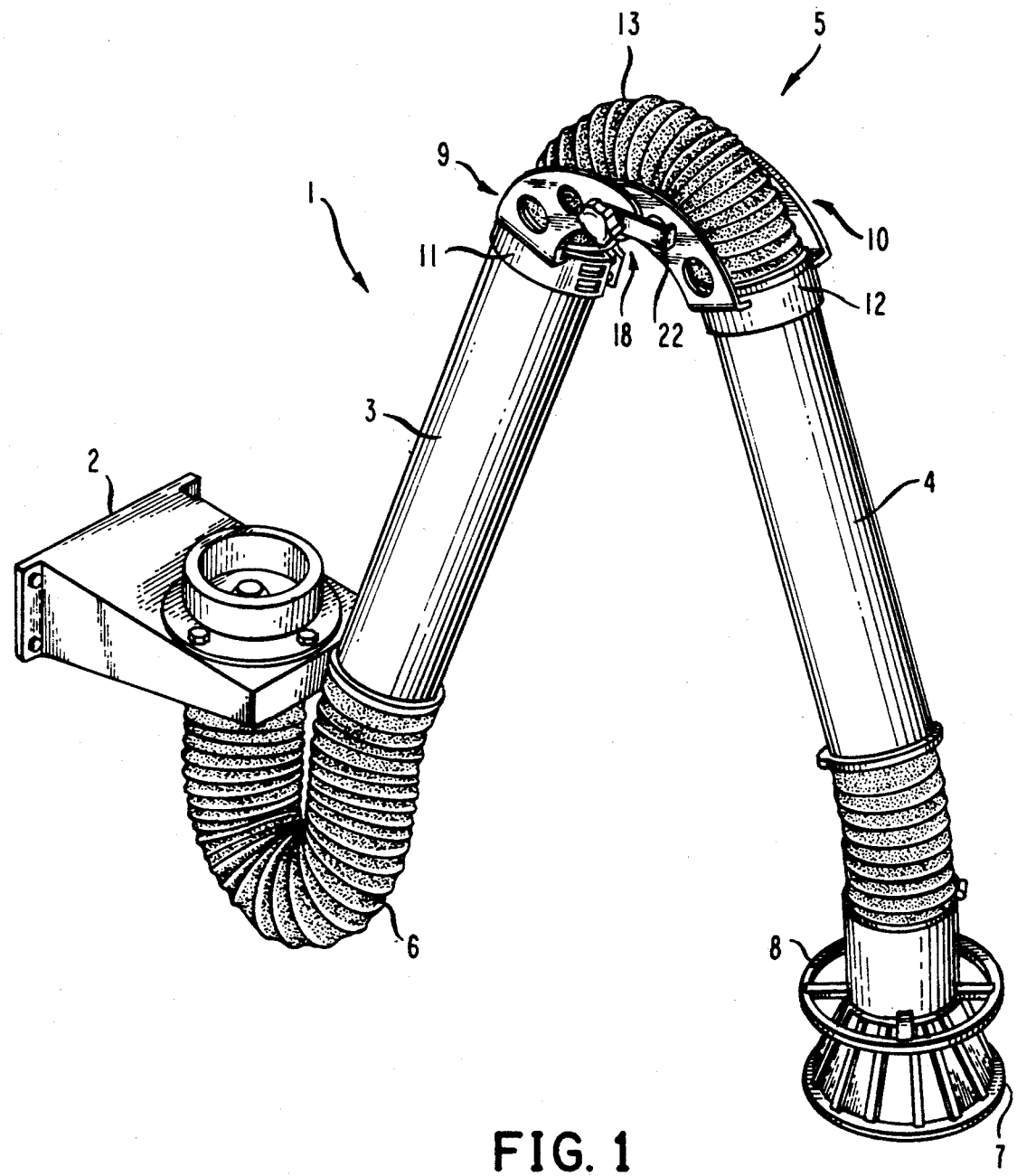

United States Patent [19]
Holmgren

[11] Patent Number: 5,211,602
[45] Date of Patent: May 18, 1993

[54] ARRANGEMENT IN FUME EXTRACTION ARMS

[75] Inventor: Ambjorn Holmgren, Lycksele, Sweden

[73] Assignee: J H Plymoth AB, Malmo, Sweden

[21] Appl. No.: 768,954

[22] PCT Filed: Apr. 17, 1990

[86] PCT No.: PCT/SE90/00254
§ 371 Date: Nov. 4, 1991
§ 102(e) Date: Nov. 4, 1991

[87] PCT Pub. No.: WO90/11845
PCT Pub. Date: Oct. 18, 1990

[30] Foreign Application Priority Data
Apr. 13, 1989 [SE] Sweden .............................. 8901331

[51] Int. Cl.⁵ ............................................. F24F 11/00
[52] U.S. Cl. ........................................ 454/63; 285/38;
285/114; 285/175; 285/184; 285/226
[58] Field of Search .................. 285/114, 184, 38, 175,
285/226; 454/63

[56] References Cited
U.S. PATENT DOCUMENTS
4,158,462 6/1979 Coral ................................ 285/184 X
4,540,202 9/1985 Amphoux ........................ 285/114 X FOREIGN PATENT DOCUMENTS
512175 8/1939 United Kingdom .

Primary Examiner—Dave W. Arola
Attorney, Agent, or Firm—Bucknam and Archer

[57] ABSTRACT

An external middle joint for an extraction arm has one first half and a second half, an inner tube and an outer tube, the inner tube being connected to a fan mounted on a wall, the outer tube having an extraction hood. The first half is connected to the outer end of the inner tube and the second half is connected to the inner end of the outer tube. Each half has a connecting piece connecting the first half to the outer end of the inner tube and connecting the second half to the inner end of the outer tube. A length of hose interconnects the outer end of the inner tube and the inner end of the outer tube, so that a continuous channel is formed from the fan to the extraction hood. Each half has two legs extending on either side of the hose, each leg being articulated to the corresponding leg of the opposite joint half by means of bolt connections. The latter have a bolt which is non-rotationally mounted in one of the legs of the other joint half and which support a knob. Driving plates are mounted in a position intermediate the corresponding knob and the adjacent leg and are anchored in the legs, respectively, in which the bolt is mounted. Upon movement of the joint, the driving plates and the knobs acquire movement identical with that of the associated bolt, so that unscrewing wing movements of the bolt connections are prevented.

6 Claims, 2 Drawing Sheets

ARRANGEMENT IN FUME EXTRACTION ARMS

The subject invention concerns generally, an arrangement in fume extraction arms and more precisely an external middle joint for an extraction arm of the kind referred to, said middle joint comprising two halves, each one of which is provided with a connection piece, one of the joint halves being connected to the outer end of an inner tubular arm and the other joint half being connected to the inner end of an outer tubular arm by means of said connection pieces, a length of flexible hose extending between and interconnecting said tubular arm ends, each joint half having two leg members projecting from the corresponding arm connection piece so as to extend alongside the length of hose on either side thereof, bolt connections being provided to articulate the outer free ends of one of said leg members to the opposite outer free ends of the other one of said two leg members.

One problem found in bolt connections comprising a movable joint is that in general they have an inherent tendency to unscrew automatically. If brake linings are used in the joint to maintain the friction at a constant level (constant joint movability), such unscrewing of the bolts of the joint must not occur since this would mean loss of the joint function.

One common method of solving this problem is to mount two needle bearings on each bolt connection in order to prevent self-unscrewing tendencies. This arrangement cannot however, provide full security because of the difficulty in supplying lubrication to the bearings, with the result that the latter may seize and cause looseness in the joint.

In order to eliminate this problem the subject invention proposes a novel and simple, yet efficient means, according to which each bolt joint comprises either a bolt which is non-rotationally mounted in one of the two leg members of each joint half and which extends with play through the opposite one of the two leg members of the other half of the joint, each bolt supporting at its outer free end a knob which is threaded onto said bolt, or a bolt which is non-rotationally mounted in both leg members of one of the joint halves and with play extends through the two leg members of the opposite joint half, each bolt supporting at its outer free end a knob which is threaded onto said bolt, and in that a driving member is mounted in a position intermediate the corresponding knob and that face of the adjacent leg member which is turned towards said driving member against which driving member said knob may be threaded in order to adjust the movability of the middle joint, said driving member being anchored in the leg member in which said bolt is non-rotationally mounted, whereby upon pivotal movement of the middle joint said driving members and consequently the knobs will be given a motion identical with that of the associated bolt, thus preventing the inherent unscrewing tendency of the bolt connections.

Figure 2:
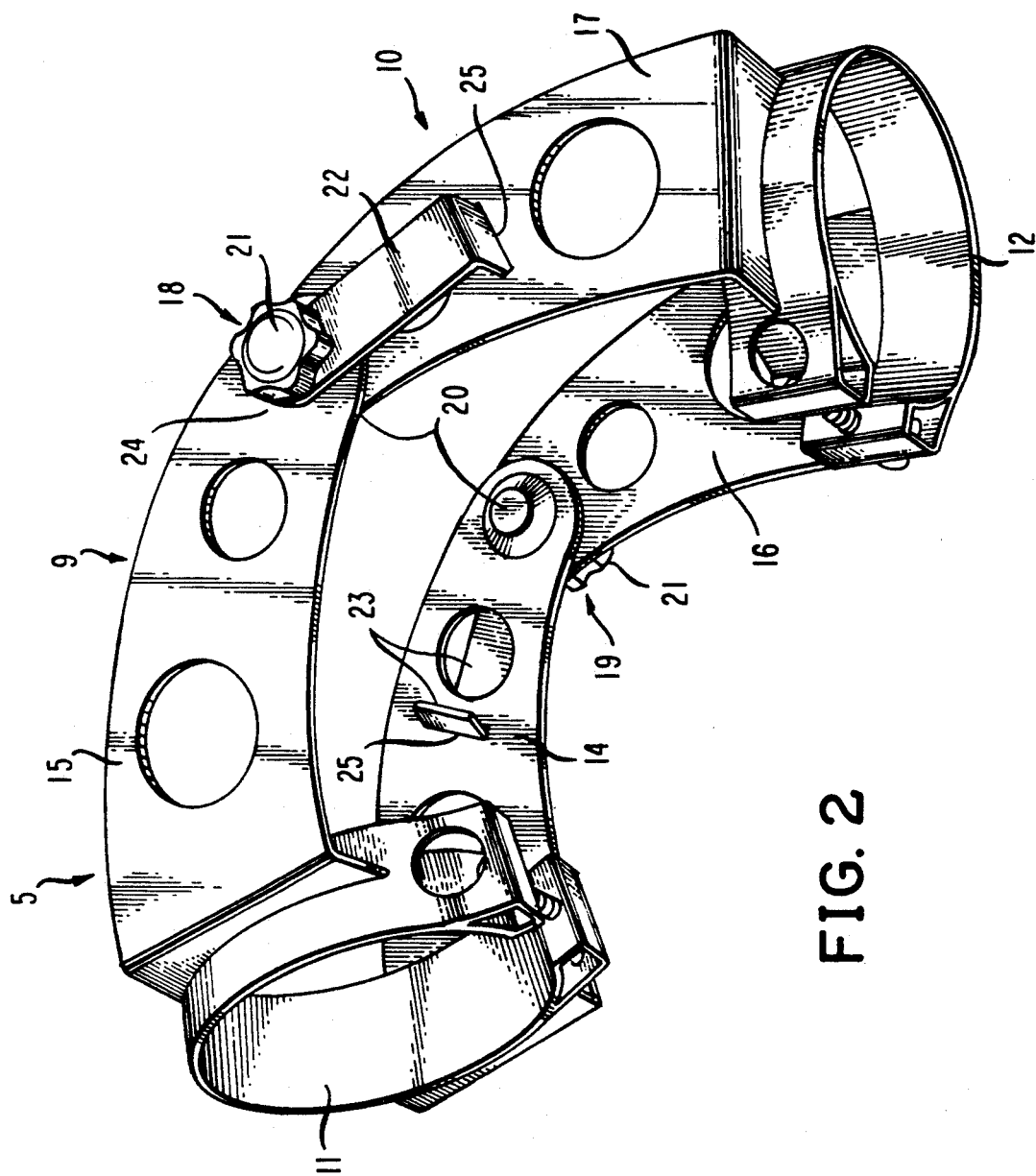

The invention will be described in closer detail in the following with reference to the accompanying drawings, wherein:

FIG. 1 illustrates an almost complete extraction arm in a perspective view from above, provided with a middle joint in accordance with the invention; and FIG. 2 illustrates the middle joint in accordance with the invention separately in a perspective view obliquely from below.

The extraction arm illustrated in FIG. 1 and generally designated by numeral reference 1 is primarily intended for localized extraction of fumes, gas, oil mists and similar exhaust fumes. The main components of the extraction arm is a wall attachment 2 on which is mounted a motor-operated extraction fan, not shown. The arm 1 further comprises an inner arm 3 and an outer arm 4 made from smooth metal tubing and the arms 3, 4 are interconnected by means of a middle joint in accordance with the invention, generally designated by numeral reference 5. A flexible tube 6 extends between the inner arm 3 and the attachment 2 and at the free end of the outer arm 4 there is provided an extraction hood 7 and a ring-shaped operating handle 8 by means of which the extraction hood 7 and consequently the entire extraction arm assembly may be moved to the desired position.

The middle joint 5 illustrated in closer detail in FIG. 2 is of the external type, i.e. it is positioned externally of the inner and outer arms 3 and 4 and it comprises two essentially identical halves 9 and 10 which in accordance with the embodiment illustrated are made from sheet metal. One of the joint halves 9 is connected to the outer end of the tubular inner arm 3 whereas the other joint half 10 is connected to the inner end of the tubular outer arm 4, more precisely with the aid of connecting pieces 11, 12 designed to be applied in a tight position about their respective arm end. A flexible piece of hose 13, see FIG. 1 extends between the two arm ends, whereby a continuous fume extraction channel is formed, extending from the extraction hood 7 to the suction fan, not shown.

Each joint half 9 and 10 is formed with two leg members 14, 15 and 16, 17, respectively, which project from the associated connection piece 11 and 12 so as to extend on either side of the piece of hose 13. In accordance with the embodiment illustrated in the drawings the leg members are formed from flat sheet metal plates having through-holes formed therein and they have an arcuate configuration, tapering towards their free ends. At its outer free ends each leg member 14, 15 and 16, 17, respectively, is articulated to a corresponding leg member of the other joint half by means of bolt connections 18 and 19 to be described in closer detail in the following.

In accordance with the embodiment illustrated in the drawings, these bolt connections 18, 19 consist of a bolt 20 which is non-rotationally attached to one of the leg members 14 and 17, respectively, of each joint half 9 and 10. The bolts 20 extend with some play through the opposite leg member 16 and 15, respectively, of the other joint half 10 and 9, respectively, and at their free ends they support a knob 21 which is screwed onto an associated bolt 20.

In accordance with an alternative embodiment, not illustrated, the bolt connections which consist of bolts corresponding to bolts 20 and which are non-rotationally mounted in both leg members 14 and 15 or 16 and 17 of one of the joint halves 9 or 10. These bolts extend with some play through the two leg members 16, 17 or 14, 15 of the other joint half 10 or 9 and at their free ends these bolts support a knob corresponding to knob 21 which is threaded onto its associated bolt.

In accordance with both embodiments the bolts 20 are carriage bolts which are non-rotationally mounted in square apertures, not shown, which are formed in the leg members. The knobs 21 on these bolts 20 preferably are in the shape of wheels formed with hand gripping surfaces.

As appears from the drawings, a driving member 22 and 23 is mounted intermediate the associated knob 21 and that face 24 of the adjacent leg member which is turned towards said driving members, in accordance with drawing FIG. 2 leg member 15 and leg member 16. Each knob 21 may be screwed towards or from its associated one of driving members 22 and 23 to adjust the movability of the middle joint 5 and each driving member 22 and 23 is anchored in the leg member - in accordance with FIG. 2 leg member 17 and 14 - to which the bolt 20 is non-rotationally attached. Upon angular movements of the middle joint 5, the driving members 22, 23 and consequently the knobs 21 thus will be imparted a movement identical to that of the associated bolt 20, whereby automatic unscrewing movements of the bolt connections 18 and 19 are prevented. The bolt connections as such thus will behave as if they were screwed into one single plate instead of to a movable middle joint.

In accordance with the embodiment illustrated in the drawings the driving members are in the shape of elongate plates which are formed at one of their ends with an aperture, not shown, for application of this plate end onto the associated bolt 20 intermediate the knob 21 and the leg member face 24 mentioned above, whereas the opposite plate end is bent inwards and is inserted in a slot 25 formed in the leg member, as explained in the aforegoing either leg member 17 or 14, in which the bolts 20 are non-rotationally mounted. The driving members may be anchored to said leg members in several other ways, such as by means of a screw joint or by means of rivets or welding, just to mention a few.

I claim:

1. An external adjustable middle joint (5) for an extraction arm (1), said extraction arm comprising an inner tube (3) and an outer tube (4), said inner tube being connected to a wall attachment (2) on which a fan is mounted, said outer tube being provided with an extraction hood (7), said middle joint comprising one first half (9) and a second half (10), said inner tube (3) having an outer end, said outer tube (4) having an inner end, said first half (9) being connected to said outer end of said inner tube (3), said second half (10) being connected to said inner end of said tube (4), first connecting member (11) connecting said first half (9) to said outer end of said inner tube (3), second connecting member (12) connecting said second half (10) to said inner end of said outer tube (4), a length of flexible hose (13) extending between and interconnecting said outer end of said inner tube and said inner end of said outer tube, whereby a continuous channel is formed from said fan to said extraction hood, said first half having two first leg members (14) and (15), said second half (10) having two second leg members (16, 17), said first leg members (14,15) projecting from said first connecting member (11), said second leg members (16,17) projecting from said second connecting member (12) wherein said first leg members and said second leg members extend along said hose (13) at both sides thereof, said first leg members (14,15) being articulated to said second leg members (16,17) by means of bolt connections (18,19), each of said bolt connections consisting of a bolt (20) which is mounted free of rotational motion in one of the first leg members (14,15) and in one of the second leg members (16,17), each of said bolts (20) extending with clearance through the opposite leg member of the first leg members and the opposite one of the second leg members, each of said bolts (20) having an outer free end and supporting threaded tightening means (21) thereon, one leg member (15) of said first leg members and one leg member (16) of said second leg members having a face (24), driving members (22,23) mounted in a position intermediate said corresponding tightening means (21) and said face (24) of the adjacent leg member (15 and 16), said tightening means (21) being screwed towards or away from its associated driving member to adjust the movability of said middle joint (5), wherein said first and second leg members (14, 15 and 16, 17) are made from flat sheet metal plates, said leg members have outer free ends and having an arcuate configuration tapering towards said outer free ends, said tightening means being in the form of wheels having gripping surfaces thereon, means for anchoring said driving members (22, 23) against relative movement in said one of said first and second leg members (17 and 14) respectively in which said bolt (20) is mounted, whereby upon angular movement of said middle joint (5), said driving members and said tightening means (21) are imparted a motion identical to the motion of said associated bolt (20) and unscrewing motion of said bolt connections (18, 29) is prevented.

2. The middle joint (5) according to claim 1 wherein said anchoring means include one of said first leg members and one of said second leg members having a slot (25), said driving members being in the form of elongated plates having at one end thereof an aperture for application on the associated bolt (20) in a position intermediate said wheel (21) and said face (24) of each said first leg member and said second leg member, said plates being bent at their opposite end and being inserted by means of said end in their respective one of said slots (25) formed in the leg members (17 and 14) in which said bolts (20) are mounted.

3. The adjustable middle joint (5) according to claim 1 wherein said bolts (20) are carriage bolts.

4. An external adjustable middle joint (5) for an extraction arm (1), said extraction arm comprising an inner tube (3) and an outer tube (4) said inner tube and being connected to a wall attachment (2) on which a fan is mounted, said outer tube being provided with an extraction hood (7), said middle joint comprising one first half (9) and a second half (10), said inner tube (3) having an outer end, said outer tube (4) having an inner end, said first half (9) being connected to said outer end of said inner tube (3), said second half (10) being connected to said inner end of said outer tube (4), first connecting member (11) connecting said first half (9) to said outer end of said inner tube (3), second connecting member (12) connecting said second half (10) to said inner end of said outer tube (4), a length of flexible hose (13) extending between and interconnecting said outer end of said inner tube and said inner end of said outer tube, whereby a continuous channel is formed from said fan to said extraction hood, said first half having two first leg members (14) and (15), said second half (10) having two second leg members (16, 17), said first leg members (14, 15) projecting from said first connecting member (11), said second leg members (16,17) projecting from said second connecting member (12) whereby said first leg members and said second leg members extend along said hose (13) at both sides thereof, said first leg members (14,15) being articulated to said second leg members (16,17) by means of bolt connections (18,19), each of said bolt connections consisting of a bolt

(20) being mounted free from rotational motion in one of said leg members and extending with clearance through another of said leg members, each of said bolts (20) having an outer free end and supporting threaded tightening means (21) thereon, one leg member (15) of said first leg members and one leg member (16) of said second leg members having a face (24), driving members (22,23) mounted in a position intermediate said corresponding tightening means (21) and said face (14) of the adjacent leg member (15 and 16), said tightening means (21) being screwed towards or away from its associated driving member to adjust the movability of said middle joint (5), wherein said first and second leg members (14, 15 and 16, 17) are made from flat sheet metal plates, said leg members have outer free ends and having an arcuate configuration tapering towards said outer free ends, said tightening means being in the form of wheels having gripping surfaces thereon, means for anchoring said driving members (22, 23) against relative movement in said one of said first and second leg members (17 and 14) respectively in which said bolts (20) are mounted, whereby upon angular movement of said middle joint (5), said driving members and said tightening means (21) are imparted a motion identical to the motion of said associated boly (20) and unscrewing motion of said bolt connections (18, 19) is prevented.

5. The middle joint (5) according to claim 4 wherein said anchoring means include one of said first leg member and one of said second leg member having a slit (25), said driving members being in the form of elongate plates having at one end thereof an aperture for application on the associated bolt (20) in a position intermediate, said wheel (21), and said face (24) of said first leg member and said second leg member, said plates being bent at their opposite end and being inserted by means of said end in their respectively one of said slits (25) formed in the leg members (18 and 14) in which said bolts (20) are mounted.

6. The adjustable middle joint (5) according to claim 4 wherein said bolts (20) are carriage bolts.

* * * * *